United States Patent
Beaven

(10) Patent No.: US 7,850,417 B2
(45) Date of Patent: Dec. 14, 2010

(54) ENGINE ARRANGEMENT

(75) Inventor: David M. Beaven, Nottingham (GB)

(73) Assignee: Rolls-Royce PLC, London (GB)

( * ) Notice: Subject to any disclaimer, the term of this patent is extended or adjusted under 35 U.S.C. 154(b) by 805 days.

(21) Appl. No.: 11/812,913

(22) Filed: Jun. 22, 2007

(65) Prior Publication Data
US 2008/0020891 A1 Jan. 24, 2008

(30) Foreign Application Priority Data
Jul. 19, 2006 (GB) ................. 0614302.8

(51) Int. Cl.
B64C 11/48 (2006.01)
(52) U.S. Cl. .................. 415/65; 415/68; 416/128; 416/160; 416/170 R
(58) Field of Classification Search ........... 415/65, 415/66, 68, 69, 70; 416/128, 160, 166, 170 R
See application file for complete search history.

(56) References Cited

U.S. PATENT DOCUMENTS 3,904,315 A 9/1975 Schwartz
4,738,589 A * 4/1988 Wright .............. 416/127
4,842,484 A * 6/1989 Johnson ............. 416/127
4,936,746 A * 6/1990 Mayo et al. ........... 416/46
5,152,668 A 10/1992 Bulman et al.
5,213,471 A * 5/1993 Miller et al. .......... 416/44
5,242,265 A 9/1993 Hora et al.

FOREIGN PATENT DOCUMENTS

JP A 2002-349700 12/2002

* cited by examiner

Primary Examiner—Ninh H Nguyen
(74) Attorney, Agent, or Firm—Oliff & Berridge, PLC

(57) ABSTRACT

In a contra rotating propeller engine propeller blade assemblies are provided which rotate in opposite directions as a result of association with an epicyclic gear assembly acting as a differential gearbox. A carrier is provided to drive one propeller blade assembly. Actuators are provided to cause pitch angle adjustment of the respective propeller blades of the assemblies. These actuators, are secured upon a stationary structure and act through actuator rods and appropriate mechanisms to cause such angular pitch adjustment. Rotational de-couplers are provided to rotationally isolate the actuators while an actuator rod part acts across the assemblies and a rotational de-coupler to de-couple contra rotation between the assemblies while still allowing axial displacement for adjustment of the other propeller blade assembly.

15 Claims, 2 Drawing Sheets

ENGINE ARRANGEMENT

The present invention relates to engine arrangements and more particularly to contra rotating propellers in an engine arrangement driven by a gas turbine engine.

FIG. 4 illustrates a basic engine architecture with respect to a contra rotating engine arrangement in which, contra rotating propeller assemblies 1, 2 are driven by an engine core 3 supplying gas through a static structure 4 and inter-meshed free power turbines 5. The turbines 5 directly drive the propellers 1, 2 which as indicated are generally contra rotating to provide propulsion for an aircraft.

Advantageously, in order to allow the propellers to operate efficiently throughout an operational flight range for an engine to provide propulsion to an aircraft, it will be understood that the pitch angle of the propellers 1, 2 must be changed by an appropriate mechanism.

A typical pitch change mechanism operates by two concentric actuators mounted on the engine centre line which pull or push a rack which in turn drive pinions which change the pitch of the propellers 1, 2. Generally there is one rack and pinion per propeller assembly 1, 2. The bearings in respect of the pitch change mechanism allow the actuators to be mounted on the static structure and allow the axial motion of the piston actuators to be transferred to the rotating hub frame of the propeller assemblies 1, 2. FIG. 5 illustrates such a prior arrangement as a schematic half cross-section. Thus, a static section 5 incorporates low pressure turbines 6 which drive contra rotating propellers 1, 2. These contra rotating propellers 1, 2 are attached to pinions 7, 8 which in turn are driven by racks 9, 10 such that the pinions 7, 8 move in the direction of arrowheads A, B. Location and support bearings 11, 12 are provided to secured upon the turbines driving the propellers 1, 2 whilst bearings 13, 14 are provided to facilitate the pitch change mechanism for the respective propellers 1, 2. It will be appreciated in use there will be a number of propellers secured about the turbine 6 in order to rotate appropriately for thrust generation. An actuator assembly 15 is provided which has two actuation mechanisms to act respectively through axial motions C to drive the racks 9, for movements in the direction A, B of the respective pinions 7, 8 and therefore adjustment of the angles of the propellers 1, 2 proportionately. As can be seen, the actuator assembly 15 is generally concentrically mounted on the static structure of the engine arrangement in accordance with this prior mechanism for adjusting pitch angle of the propeller assemblies 1, 2.

The problem with such prior arrangements is that the speed of the turbines is limited by the maximum tip speed of the propellers which means that the turbine is turning more slowly than would be desired for an optimum turbine design. This slower turning of the turbine in turn means that the turbine requires more stages to achieve an efficient operational design. Co-axial hydraulic cylinders are required to be mounted upon the engine centre line. Each actuator mechanism in the assembly 15 as described above will add complexity in terms of racks and pinions for propeller assembly 1, 2 adjustment. Additional machine components also add complexity and cost to the overall arrangement design.

In accordance with aspects of the present invention there is provided an engine arrangement for a contra rotating engine, the arrangement comprising a first propeller assembly and a second propeller assembly arranged to rotate in opposite directions and a first actuator for angular displacement of propellers of the first propeller assembly and a second actuator for angular displacement of propellers of the second propeller assembly, the arrangement characterised in that the first propeller assembly and the second propeller assembly are associated with an epicyclic gear assembly and one of the first propeller assembly or the second propeller assembly is associated through a carrier of the epicyclic gear assembly to provide rotation and at least one of the first actuator or the second actuator has an actuator rod extending through the carrier and the actuator rod includes a rotational de-coupler to allow contra rotation of the associated first propeller assembly or the second propeller assembly to the direction of rotation of the carrier.

Typically, the actuator and/or the second actuator are secured upon a common stationary structure. Typically, the common stationary structure is rotationally isolated from the propeller assembly by bearings.

Generally, the epicyclic gear assembly includes a planet gear set associated with the carrier. Typically, the actuator rod passes through a planet gear. Possibly, the actuator rod passes between planet gears in the epicyclic gear assembly.

Possibly, the engine arrangement will incorporate a number of actuator rods extending through the carrier.

Typically, the actuator rod is coupled to a yoke for angular rotation of propellers of the associated first propeller assembly or the second propeller assembly. Typically, the yoke is associated with a bell crank to provide angular rotation of respective propeller blades of the propeller assembly in use.

Possibly, the actuator rod is coupled through its associated actuator to provide axial displacement in use.

Possibly, the first actuator and/or the second actuator comprises a hydraulic piston or hydraulic motor or electric motor.

Possibly, the rotational de-coupler comprises a bearing within the actuator rod itself. Alternatively, the rotational de-coupler is provided within a connection between the actuator rod and the first propeller blade assembly or the second propeller blade assembly. Such connector may comprise a circumferential groove having a rotational bearing and a linear bearing.

Also in accordance with aspects of the present invention there is provided a contra rotating propeller engine incorporating an engine arrangement as described above.

Further in accordance with aspects of the present invention there is provided a mounting arrangement comprising a first assembly and a second assembly arranged to rotate in opposite directions and a first actuator for angular displacement of the first assembly and a second actuator for angular displacement of the second assembly, the arrangement characterised in that the first assembly and the second assembly are associated with an epicyclic gear assembly and one of the first assembly or the second assembly is associated through a carrier of the epicyclic gear assembly to provide rotation and at least one of the first actuator or the second actuator has an actuator rod extending through the carrier and the actuator rod includes a rotational de-coupler to allow contra rotation of the associated first assembly or the second assembly to the direction of rotation of the carrier.

Additionally, in accordance with aspects of the present invention there is provided a mounting arrangement comprising an assembly arranged to rotate and an actuator for angular displacement of the assembly, the arrangement characterised in that the assembly is associated with an epicyclic gear assembly and the assembly is associated through a carrier of the epicyclic gear assembly to provide rotation, the actuator has an actuator rod extending through the carrier and the actuator rod includes a rotational de-coupler to allow contra rotation of the assembly to the direction of rotation of the carrier.

Embodiments of the present invention will now be described by way of example only with reference to the accompanying drawings in which.

As indicated above, in order to provide efficient operation, it is generally necessary to provide a multiplicity of racks and pinions or similar mechanisms for angular turning and twisting of propeller blades in a propeller blade assembly of a contra rotating propeller engine. Each one of these means for providing angular adjustment of the propeller blades will require its own actuator and therefore add to complexity.

In accordance with aspects of the present invention an epicyclic gear assembly is utilised in order to provide contra rotational drive for respective propeller blades in a first propeller blade assembly and a second propeller blade assembly. Each of the blades in the first propeller blade assembly and the second propeller blade assembly is associated with appropriate angular adjustment means to change the angle or pitch of the propellers in use. Generally, the epicyclic gear assembly will comprise a sun gear which is driven by the turbine and respective planet gears which will be associated with a carrier in the form of a plate which itself will rotate and this rotation will be transmitted to a first propeller blade assembly whilst a second propeller blade assembly is associated with a ring gear to rotate in the opposite direction to the carrier and therefore the first propeller blade assembly. This contra rotation as indicated provides the means for efficient propulsion by an engine incorporating an engine arrangement in accordance with aspects of the present invention. Isolation of the means for variation in angular pitch for the respective first propeller blade assembly and the second propeller blade assembly from this rotation is necessary and as indicated has caused considerable problems with respect to complexity and necessary machining with prior arrangements.

Figure 1:
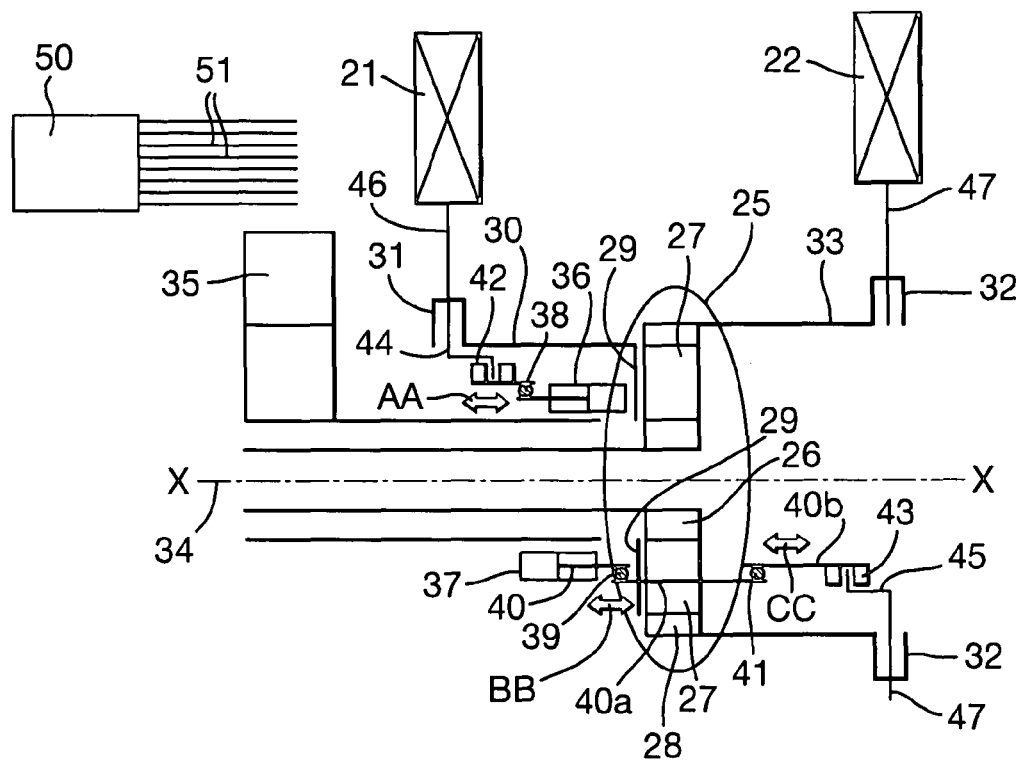
FIG. 1 is a schematic illustration of a coupling arrangement in accordance with aspects of the present invention.
Figure 4:
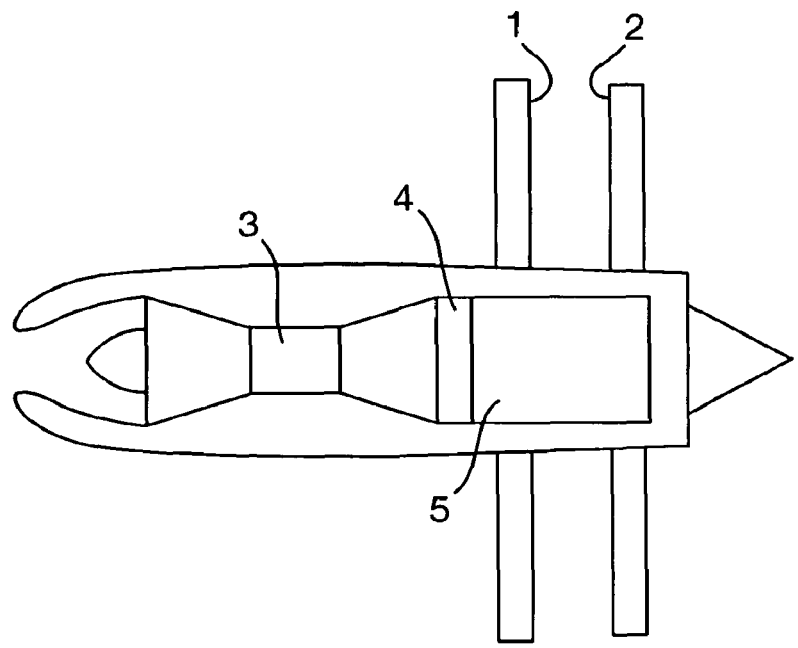
FIG. 4 is a schematic illustration of a known basic contra rotating engine.
Figure 5:
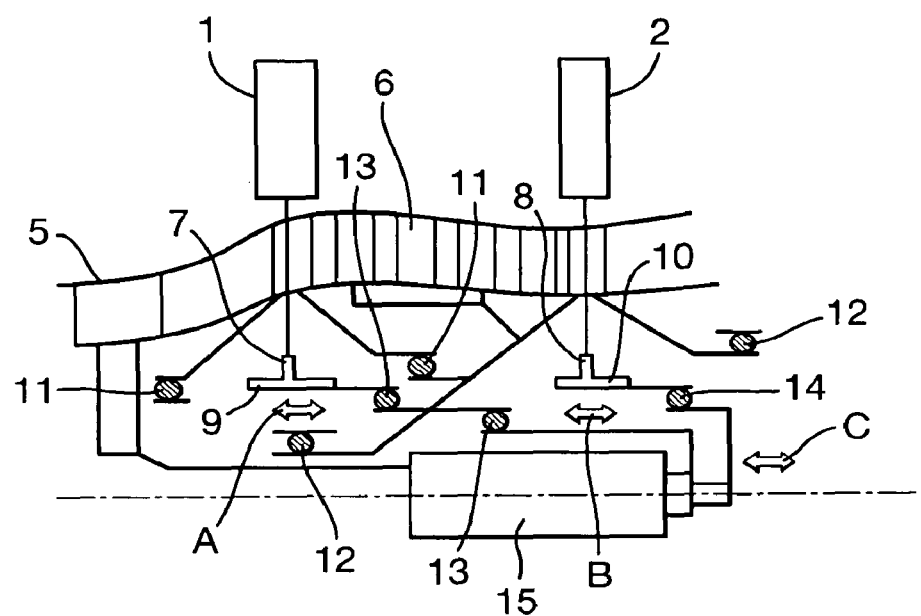
FIG. 5 is a schematic illustration of a known coupling arrangement.

FIG. 1 provides a schematic illustration of an engine arrangement in accordance with aspects of the present invention. Thus, propellers 21, 22 are associated with an epicyclic gear assembly 25 comprising a sun gear 26, planet gears 27, and a ring gear 28. The planet gears 27 are associated with a carrier 29 normally in the form of a plate which rotates with the gears 27 through a coupling 30 in order to drive rotation of a first propeller blade assembly 21 (only one blade is shown but it will be appreciated from FIG. 4 that a plurality of such blades will be arranged around a hoop or hub 31 driven through the coupling 30). A second propeller blade assembly 22 is also driven through a hoop or hub 32 via a coupling 33 associated with the ring gear 28. In such circumstances the direction of rotation of the first propeller assembly 21 and second propeller assembly 22 will be opposite to each other. This rotation is driven through a drive shaft 34 from a turbine of an engine in accordance with aspects of the present invention. In such circumstances it will be appreciated that the assemblies 21, 22 will contra rotate dependent upon the rotational speed of the shaft 34 and gear ratios and differentials within the epicyclic gear assembly 25.

As indicated above, in order to achieve operational efficiency the angular pitch of the blades in the assembly 21, 22 is adjusted. This adjustment is achieved through axial displacement of an actuator assembly in accordance with aspects of the present invention.

It is most convenient if the actuators of the actuator assembly are secured to a stationary structure, that is to say non-rotating parts of an arrangement in accordance with aspects of the present invention. Thus, a stationary structure 35 provides mountings for a respective first actuator 36 and second actuator 37. These actuators 36, 37 are associated with the hubs 31, 32 upon which the propeller blade assemblies 21, 22 rotate through bearings 38, 39. These bearings 38, 39 allow rotation of the hubs whilst the actuators 36, 37 remain stationary but provide for axial displacement in the direction of arrowheads AA, BB of an actuator rod in accordance with aspects of the present invention. Thus, the hubs can rotate about an axis X-X as a result of the rotation of the coupling axis of the bearings 38, 39 and spindle 46, 47 or stub mounting for the individual propeller blades turned for pitch by converting the axial displacement of the actuator rod for pitch adjustment.

As indicated above, the assemblies 21, 22 are contra rotating. In such circumstances, positioning the actuators 36, 37 statically to one side, that is to say forward of the epicyclic gear assembly 25 necessitates provision of an actuator rod 40 which extends through the assembly 25. It will be appreciated, and described below with regard to FIG. 2, that the actuator rod 40 can extend through the epicyclic gear assembly 25 and will be swept with the carrier 29 but the rotation of that actuator rod 40 with the carrier 29 will be in the same direction as rotation of the first propeller blade assembly 21 and therefore would be contrary to and conflict with the direction of rotation of the second propeller blade assembly 22. In such circumstances, a rotational de-coupler 41 is provided which still allows axial displacement in the direction of arrowheads CC whilst the bearing 41 de-couples the contra rotation between the assemblies 21, 22 or more particularly the carrier 29 driving rotation of the assembly 21.

With such axial displacement AA and BB; CC it will be understood that yokes 42, 43 can be provided within which bell cranks 44, 45 can act in order to turn respective spindle shafts 46, 47 to which the propeller blades of the assemblies 21, 22 are respectively connected in order to turn the angular pitch of the blades as required for operational efficiency. In summary, it will be appreciated the first propeller blade assembly 21 as indicated above is driven in rotation by association with the carrier 29 and angular pitch of the blades in the assembly 21 set through the actuator 36 displacing the yoke 42 and crank 44 to adjust the spindle 46. The actuator 36 is rotationally isolated by the bearing 38 but will still provide axial movement in the direction of arrowheads AA in order to turn the spindle 46 through the crank 44.

In accordance with aspects of the present invention the second propeller blade assembly 22 is driven by the epicyclic gear assembly 25 to contra rotate to that of the first assembly 21 whilst angular pitch of the respective propeller blades in the second propeller blade assembly 22 is achieved through the actuator 37 causing axial displacement in the direction of arrowheads BB through a first rotation de-coupling bearing 39 to isolate the stationary actuator 37 from rotation of the carrier plate 29 such that a first part of the actuator rod 40a can rotate with that carrier 29 about the axis X-X in the same direction as the first propeller blade assembly 21. A rotational de-coupler 41 as illustrated in the form of a bearing then de-couples that direction of rotation from the contra direction of rotation of the second propeller blade assembly 22 but still facilitates axial displacement in the direction of arrowheads CC of a second actuator rod section 40b to cause movement of the yoke 43 and therefore adjustment of the bell crank 45 to turn the spindle 47 and therefore respective pitch angle of the propeller blades in the second propeller blade assembly 22. In such circumstances the actuator rod section 40a bridges between bearings 39, 41 to de-couple rotation between the respective contra rotations of assemblies 21, 22.

It will be appreciated that as depicted the actuators 36, 37 may take the form of hydraulic pistons which cause direct axial displacement of the actuator rods to cause movement of the yokes 42, 43 and therefore adjustment of the spindles 46, 47 for angular pitch of the respective propeller blades in the assemblies 21, 22. However, alternative actuators may include hydraulic motors or electric motors and in particular electrical servo motors to cause positional displacement of the actuator rods in accordance with aspects of the present invention in order to turn the yokes and therefore adjust propeller blade angular pitch. The present invention provides less emphasis with regard to the actual manner or creation of the axial displacement and more particularly in accordance with aspects de-coupling of the respective rotational motions between the assemblies 21, 22.

Figure 2:
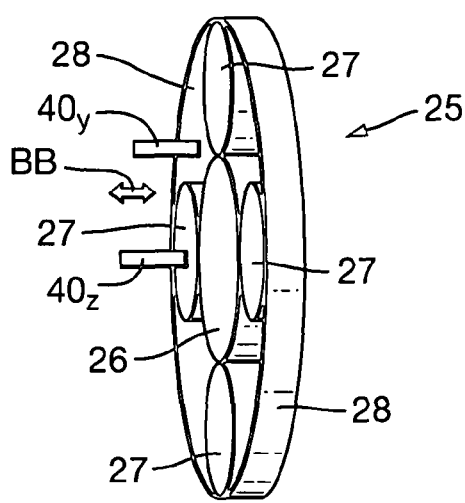
FIG. 2 is a schematic illustration of an epicyclic gear assembly in accordance with aspects of the present invention with a carrier removed for clarity; and, FIG. 3 is a schematic illustration of an alternative rotational de-coupler configuration in accordance with aspects of the present invention.

FIG. 2 provides a schematic part perspective view of the epicyclic gear assembly 25 in accordance with aspects of the present invention. Similar reference nomenclature has been used for comparison with FIG. 1. Carrier plate 29 (FIG. 1) has not been depicted in FIG. 2 for clarity but it will be appreciated that this carrier plate will be secured to the planet gears 27 in order to cause rotation about the sun gear 26. As indicated previously, this sun gear 26 will provide drive for the assembly 25 such that the carrier will rotate in one direction and the ring gear 28 will rotate in the opposite direction to provide the contra rotation in accordance with desired propeller blade assemblies 21, 22 (FIG. 1) as described previously.

As aspects of the present invention incorporate a counter-rotation de-coupling device such as bearing 41 (FIG. 1) it will be appreciated that actuator rods 40z, 40y can pass through the assembly 25 as these actuator rods 40z, 40y will be de-coupled from the direction of rotation of the planet gears. It will be appreciated that the actuator rods 40y, 40z will pass through the carrier plate in appropriate apertures and will rotate with that carrier but through the de-coupler 41 (FIG. 1) will allow contra rotation between the assemblies 21, 22. The actuator rods 40y, 40z will move in the direction of arrowheads BB as described previously in order to cause movement of a yoke 43 and therefore adjustment of the angular pitch setting spindle 47 as described previously with regard to FIG. 1.

As can be seen in FIG. 2, the actuator rods can pass through a respective planet gear 27 (see actuator rod section 40z) or in space sections between planet gears 27 as seen with regard to actuator rod section 40y. In such circumstances a number of actuator rods in accordance with aspects of the present invention can be provided which extend across the epicyclic gear assembly 25. Each one of these actuator rods 40 will act upon yoke 43 to cause displacement of the spindle 47. Alternatively, each one of these actuator rods 40 may act by its own yoke to cause displacement of a spindle 47. Thus, as described previously, where it is desirable to provide a range of angular pitch adjustments for different rotational speeds provision of a number of respective actuator rods 40 will enable those particular angular pitch adjustments to be done through a respective rod 40 to yoke to spindle association.

Generally, each actuator rod 40 as indicated will have its own actuator 37 and these actuators will be remotely controlled. Alternatively, the axial action of the actuators 37 may be ganged together using a connector piece linked to each of the actuators. This would allow for a dissimilar number of actuator rods 40 to actuators 37. Preferably, all actuators 37 and all rods 40 will act in unison at any one time for a desired angular pitch adjustment. In alternative circumstances only one actuator or group of actuators could be operational for a propeller assembly at any one time for desired angular pitch adjustment through the respective actuator rod. As can be seen in FIG. 1 a hydraulic pump 50 may include a number of hydraulic pipe 51 associations with the actuators 36, 37 to cause angular pitch adjustment of the respective propeller blades in the assemblies 21, 22. Alternatively, the hydraulic pump may be replaced by an electric signal generator which through wiring to electric motors will cause movement of the actuators 36, 37 for respective angular pitch adjustment of the propeller blades in the assemblies 21, 22. As will be appreciated, only the actuators required for a particular operational stage of an arrangement in accordance with aspects of the present invention will be activated at any one time to cause pitch adjustment.

It will be appreciated the epicyclic gear assembly 25 in accordance with aspects of the present invention acts as a differential gearbox to drive the contra rotating propeller blade assemblies 21, 22 from a single drive shaft 34 coupled to a power turbine in accordance with aspects of the present invention. In such circumstances, the number of components required to create the contra rotation and blade pitch angle adjustment is reduced.

Figure 3:
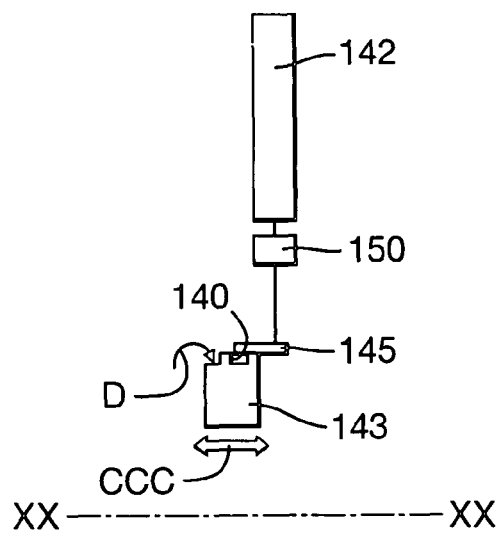

As indicated above, it is possible to utilise simple caged ball-bearing assemblies to provide the rotational de-couplers 38, 39, 41 in accordance with aspects of the present invention. Alternatively, these bearings 38, 41 may be replaced with a circumferential groove in the respective yoke 42, 43 with the respective bell crank 44, 45 then incorporating itself a rotational bearing and a linear bearing for axial displacement. FIG. 3 provides a schematic illustration of such a bell crank arrangement. Thus, a yoke 143 is subject to axial displacement in the direction of arrowheads CCC whilst rotating about an axis XX-XX in the direction of arrowheads D. This rotation D will be with a propeller blade assembly as described previously. Alternatively, the yoke may be static. Within the yoke 143 a groove channel 140 is provided within which a bell crank 145 is located. The bell crank 145 will rotate with and in the direction of the propeller blade assembly. Thus, the bell crank 145 will rotate around the circumferential groove channel of the yoke. The bearings incorporated in the bell crank will be provided to decouple the rotation of the bell crank, and the respective propeller assembly, from the yoke. Thus, as previous, the axial direction of CCC causes movement of the bell crank 145 which in turn causes rotation of a spindle to adjust the respective propeller blades 142 of a propeller blade assembly.

Modifications and alterations to the present invention will be appreciated by those skilled in the art. Thus, for example the arrangement of first propeller blade assemblies and second propeller blade assemblies as described above may be vice versa. Furthermore, rather than utilising yokes and a bell crank as described above it will be appreciated that the axial displacement of the actuator rods may cause movement of rack and pinion arrangements to cause adjustment of respective propeller blade position.

It will also be understood that aspects of the present invention provide a mounting arrangement where at least one assembly is driven by a carrier and an actuator rod acts through axial displacement across the carrier with a rotational de-coupler isolating rotation from such axial displacement for actuation.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. An engine arrangement for a contra rotating engine, the arrangement comprising:
   a first propeller assembly and a second propeller assembly arranged to rotate in opposite directions, each of the first propeller assembly and the second propeller assembly including propellers;
   a first actuator for angular displacement of the propellers of the first propeller assembly and a second actuator for angular displacement of the propellers of the second propeller assembly, wherein
      the first propeller assembly and the second propeller assembly are associated with an epicyclic gear assembly that includes a planet gear set associated with a carrier of the epicyclic gear assembly,
      one of the first propeller assembly or the second propeller assembly is associated through the carrier of the epicyclic gear assembly to provide rotation,
      at least one of the first actuator and the second actuator has an actuator rod extending through the carrier and the actuator rod includes a rotational de-coupler to allow contra rotation of the associated first propeller assembly or the second propeller assembly to the direction of rotation of the carrier, and the actuator rod passes between planet gears in the epicyclic gear assembly.

2. An arrangement as claimed in claim 1 wherein the actuator and/or the second actuator are secured upon a common stationary structure.

3. An arrangement as claimed in claim 2 wherein the common stationary structure is rotationally isolated from the propeller assembly by bearings.

4. An arrangement as claimed in claim 1 wherein the engine arrangement will incorporate a number of actuator rods extending through the carrier.

5. An arrangement as claimed in claim 4 wherein at least one of the actuator rods passes through the planet gear.

6. An arrangement as claimed in claim 1 wherein the actuator rod is coupled to a yoke for angular rotation of the propellers of the associated first propeller assembly or the second propeller assembly.

7. An arrangement as claimed in claim 6 wherein the yoke is associated with a bell crank to provide angular rotation of respective propeller blades of the propeller assembly in use.

8. An arrangement as claimed in claim 1 wherein the actuator rod is coupled through its associated actuator to provide axial displacement in use.

9. An arrangement as claimed in claim 1 wherein the first actuator and/or the second actuator comprises a hydraulic piston or hydraulic motor or electric motor.

10. An arrangement as claimed in claim 1 wherein the rotational de-coupler comprises a bearing within the actuator rod itself.

11. An arrangement as claimed in claim 1 wherein the rotational de-coupler is provided within a connection between the actuator rod and the first propeller blade assembly or the second propeller blade assembly.

12. An arrangement as claimed in claim 11 wherein the connector comprises a centrifugal groove having a rotational bearing and a linear bearing.

13. A contra rotating propeller engine incorporating an engine arrangement as claimed in claim 1.

14. A mounting arrangement comprising:
   a first assembly and a second assembly arranged to rotate in opposite directions,
   a first actuator for angular displacement of the first assembly and a second actuator for angular displacement of the second assembly, wherein
   the first assembly and the second assembly are associated with an epicyclic gear assembly,
   one of the first assembly or the second assembly is associated through a carrier of the epicyclic gear assembly to provide rotation,
   at least one of the first actuator and the second actuator has an actuator rod that passes between planet gears in the epicyclic gear assembly, and
   the actuator rod includes a rotational de-coupler to allow contra rotation of the associated first assembly or the second assembly to the direction of rotation of the carrier.

15. A mounting arrangement comprising:
   an assembly arranged to rotate and an actuator for angular displacement of the assembly, wherein
   the assembly is associated with an epicyclic gear assembly and the assembly is associated through a carrier of the epicyclic gear assembly to provide rotation,
   the actuator has an actuator rod that passes between planet gears in the epicyclic gear assembly, and
   the actuator rod includes a rotational de-coupler to allow contra rotation of the assembly to the direction of rotation of the carrier.

* * * * *